United States Patent [19]
Schneider et al.

[11] 4,038,687
[45] July 26, 1977

[54] VIDEO BLANKING CIRCUIT

[75] Inventors: Dennis Michael Schneider, Sewell; Lucas John Bazin, Vincentown, both of N.J.

[73] Assignee: RCA Corporation, New York, N.Y.

[21] Appl. No.: 715,301

[22] Filed: Aug. 18, 1976

[30] Foreign Application Priority Data

Mar. 19, 1976 United Kingdom ............... 11120/76

[51] Int. Cl.² .............................................. H04N 5/14
[52] U.S. Cl. .................................................. 358/165
[58] Field of Search ............................... 358/170, 165

[56] References Cited
U.S. PATENT DOCUMENTS 3,371,160 2/1968 Hurford ........................... 358/170 X
3,739,092 6/1973 Legler .................................. 358/165

Primary Examiner—Robert L. Richardson
Attorney, Agent, or Firm—Eugene M. Whitacre; Mason DeCamillis

[57] ABSTRACT

A video blanking circuit is provided which inserts a system blanking interval signal having controlled leading and trailing edges into a video signal. The blanking signal is combined with a clamped video signal in a first non-additive mixer which also provides a white clip level. The output of the first non-additive mixer is further coupled to a second non-additive mixer in which black level excursions are clipped so as to provide an output video signal having a proper system blanking interval into which synchronizing information may be added to complete the composite video waveform.

6 Claims, 5 Drawing Figures

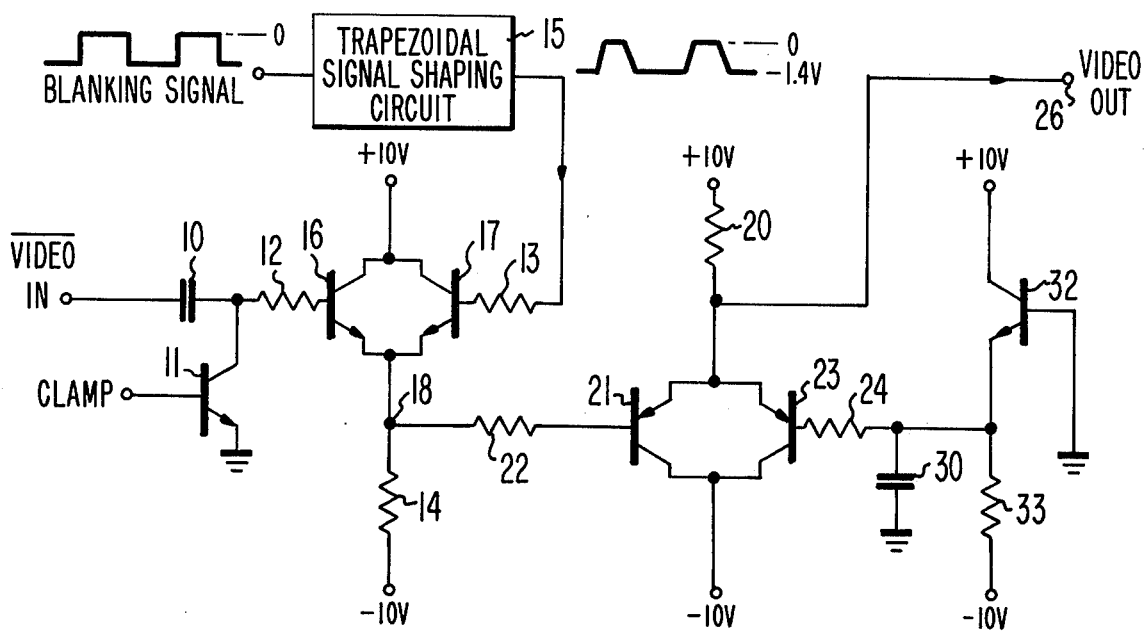
Fig.1
Fig.2A
Fig.2B
Fig.2C
Fig.2D

VIDEO BLANKING CIRCUIT

BACKGROUND OF THE INVENTION

This invention relates to circuitry for inserting a system blanking interval into a video signal obtained, for example, from an image pickup device.

The video signals from the image pickup tubes used in a television system include objectionable spurious signals and noise which occur during the retrace and transition from active to inactive portions of the scanning beam travel. Since the retrace portion of the video signal is used to convey the synchronizing components for each television line, it is necessary to provide a baseline during the retrace interval free from such spurious signals and noise in order to insert properly shaped synchronizing components for developing the composite video waveform.

Known circuits for removing the spurious signals occurring during the retrace interval generally comprise a video input signal clamp for establishing black level reference followed by a transistor switch which is operated by a blanking signal so as to literally obliterate the video waveform during the retrace interval. These known circuits, however, often do not produce a properly shaped blanking interval as specified by the television waveform standards promulgated by various television standards committees, such as the U.S. Federal Communications Commission (FCC). Generally, the characteristics of such blanking interval switches in the form of uncontrolled risetimes, interelectrode capacity and variation of storage time with temperature, for example, severely affect the risetime and duration of the rigidly defined blanking interval period in the video output waveform.

SUMMARY OF THE INVENTION

A video blanking circuit is provided for inserting a system reference signal into a video signal having active and retrace periods. The blanking circuit comprises a non-additive mixer coupled to signal clamping means which clamps the video signal to a reference potential during retrace and to a system reference generator which provides a system reference signal occurring during the retrace period. The output signal from the non-additive mixer contains the original active video signal with the system reference signal inserted into the video signal retrace period.

BRIEF DESCRIPTION OF THE DRAWINGS

FIG. 1 is a detailed schematic of a video blanking circuit embodying the present invention; and FIGS. 2A, 2B, 2C and 2D illustrate waveforms depicting the operation of the circuit of FIG. 1.

DESCRIPTION OF THE INVENTION

In FIG. 1, a negative-going video signal having active and retrace periods derived from the scanning of an image pickup tube is coupled by a capacitor 10 to the collector electrode of a transistor 11. The emitter electrode of transistor 11 is coupled to a point of reference (ground). A clamp signal (not shown) occurring during the retrace period ($t_3 - t_4$ of FIG. 2) is coupled to the base electrode of transistor 11. In operation, transistor 11, under the control of the clamp signal input, functions as an input signal clamp for the purpose of establishing a black signal reference level at substantially zero volts, as illustrated by waveform 2A. The common point of capacitor 10 and the clamp circuit comprising transistor 11 is coupled by a resistor 12 to one input terminal of a positive non-additive mixer (NAM) comprising transistors 16 and 17 coupled between a source of potential $+10V$ and a source of potential $-10V$ by a resistor 14, which operates in a manner described, for example, in U.S. Pat. No. 3,371,160 — W. L. Hurford. The other input terminal of the positive NAM is coupled to the output terminal of a trapezoidal signal shaping circuit 15, which has coupled to its input terminal a square wave blanking waveform timed to occur during the retrace interval. The trapezoidal signal shaping circuit in the form of an active filter described in detail, for example, in a masters thesis by Lucas John Bazin at the Moore School of Electrical Engineering of the University of Pennsylvania, January, 1970, entitled, "Design of Active RC Filters", is arranged to reshape the input square wave blanking signal into an output signal which corresponds to the desired system blanking signal (FIG. 2B, for example), as specified in the television standards for the particular television system being utilized, i.e., NTSC, PAL or SECAM.

Insofar as described, the operation of the illustrated circuit is as follows: the clamped video input of FIG. 2A is non-additively mixed with the shaped blanking reference of FIG. 2B. As is well known, in a positive non-additive mixer (NAM), the most positive signal input will dominate, that is, the device with the least positive signal applied to its input will be cutoff so that the most positive of the two input signals will appear at the output terminal of the NAM to the exclusion of the least positive input. During the blanking interval, the negative-going white noise spikes on the input video signal indicated as occurring during the transitional times $t_1 - t_2, - t_5 - t_6$ from active video and back again are controlled by the rise and fall times of the shaped blanking signal, while negative-going white noise pulses occurring, for example, at time $t_3$ due to the clamp signal are inhibited by the zero volt level of the system blanking signal applied to the positive NAM. During the active video period, the output video signal is not allowed to be more negative than $-1.4$ volts because of the controlling $-1.4$ volt level of the system blanking signal, as illustrated in waveform 2C. The output signal from the positive NAM at terminal 18, the common point of resistor 14 and the emitters of transistors 16 and 17 therefore represents the video signal with a properly shaped system blanking signal interval. As previously described in connection with the positive NAM, the white level signal clipping is determined by the amplitude ($-1.4V$) of the shaped system reference signal, which, if desired, may be made variable for an adjustable white level clip. However, due to the single polarity action of the positive NAM, the black level excursions, such as indicated at time $t_4$ of the blanked video signal in FIG. 2C, are not affected. Unwanted black level excursions in the form of positive-going noise spikes, etc., may be removed from the signal by the utilization of a negative NAM for black signal clipping, as illustrated by transistors 21, 23 and its associated components resistors 20, 22, 24. As is well known, in a negative non-additive mixer (NAM), the most negative signal input will dominate, that is, the device with the least negative signal applied to its input will be cutoff so that the most negative of the two input signals will appear at the output terminal of the NAM to the exclusion of the least negative input. The output signal of the positive NAM in the form of white-clipped video with properly shaped system blanking inserted is coupled to one input terminal of the negative NAM by means of resistor 22. The other input terminal of the negative NAM is advantageously utilized by coupling to it a zero bias correction circuit comprising the series combination of transistor 32 and resistor 33 coupled between a positive source of potential +10V and a negative source of potential −10V. A capacitor 30 coupled to the common point of resistor 33 and the emitter of transistor 32 serves to stabilize and filter the bias voltage applied to the reference terminal of the negative NAM by means of resistor 24. As illustrated, the $V_{BE}$ drop of transistor 32 appearing at the reference terminal of the negative NAM compensates for the $V_{BE}$ drop of transistor 16 which, if not compensated for, would shift the clamped input signal to transistor 16 from substantially zero volts representing black signal level. The output signal from the negative NAM at terminal 26 (VIDEO OUT), as illustrated by waveform 2D, is a video signal with a properly shaped inserted system blanking interval free of noise and transitional switching pulses of both polarities. The video blanking circuit embodying the invention also provides, as described above, the additional advantageous feature of a white signal level clipping function which is normally accomplished in known circuits by additional circuitry located later in the signal processing channel. Further, black level clipping is accomplished by the use of an additional non-additive mixer stage with no noise or extraneous signals being injected during the critical blanking interval.

What is claimed is:

1. A circuit for inserting a system reference signal into a video signal having active and retrace periods, comprising:
    signal clamping means for clamping said video signal to a reference potential during said retrace period;
    means for generating a reference signal occurring during said retrace period; and
    a non-additive signal mixer responsive to said clamped video signal and said reference signal for developing an output signal wherein said reference signal is inserted into said video signal retrace period.

2. A circuit according to claim 1 wherein said reference signal is a blanking signal having controlled leading and trailing edges and timed to coincide with said retrace period.

3. A circuit for inserting a system blanking signal into a video signal having active and retrace periods for generating a blanked video signal comprising:
    signal clamping means for clamping said video signal to a reference potential during said retrace period;
    means for generating a blanking signal having controlled leading and trailing edges and timed to coincide with said retrace period;
    a first non-additive signal mixer responsive to said clamped video signal and said blanking signal for developing a first output signal wherein said blanking signal is inserted into said video signal retrace period and for limiting signal excursions of a first polarity; and
    a second non-additive signal mixer responsive to said first output signal and a second reference signal for developing a second output signal in which excursions of a second polarity are limited.

4. A circuit according to claim 3 wherein said first and second signal polarities represent white and black video signal levels.

5. A circuit according to claim 4 wherein said reference potential represents the black signal level and the amplitude of said blanking signal represents the white signal level.

6. A circuit according to claim 5 wherein the amplitude of said blanking signal is adjustable for providing a variable white signal level.

* * * * *